W. E. ADAMS.
AUTOMOBILE SIGNAL.
APPLICATION FILED APR. 2, 1917.

1,258,850.

Patented Mar. 12, 1918.

INVENTOR:
W. E. Adams.
BY his ATTORNEY:
A. M. Carlsen.

UNITED STATES PATENT OFFICE.

WILLIAM E. ADAMS, OF ST. PAUL, MINNESOTA.

AUTOMOBILE-SIGNAL.

1,258,850.

Specification of Letters Patent.   Patented Mar. 12, 1918.

Application filed April 2, 1917.   Serial No. 159,070.

*To all whom it may concern:*

Be it known that I, WILLIAM E. ADAMS, a citizen of the United States, residing at St. Paul, in the county of Ramsey and State of Minnesota, have invented a new and useful Automobile Signal, of which the following is a specification.

My invention relates to signal devices for automobiles and other vehicles, and the object is to provide an efficient signal device, which when mounted on a vehicle may readily and easily be operated by the driver or motor man so as to indicate when the vehicle is about to be turned to right or left, and thus by the signal warn pedestrians or drivers of other vehicles to keep out of the way where the turning vehicle is taking a new direction, as when turning from a main road or street into a crossing road or street. To make the signal more effective as may be required under certain circumstances, I make it in duplicate, that is, a right and a left signal at the rear end of the vehicle and a right and left signal near the front end of the vehicle.

Figure 1:
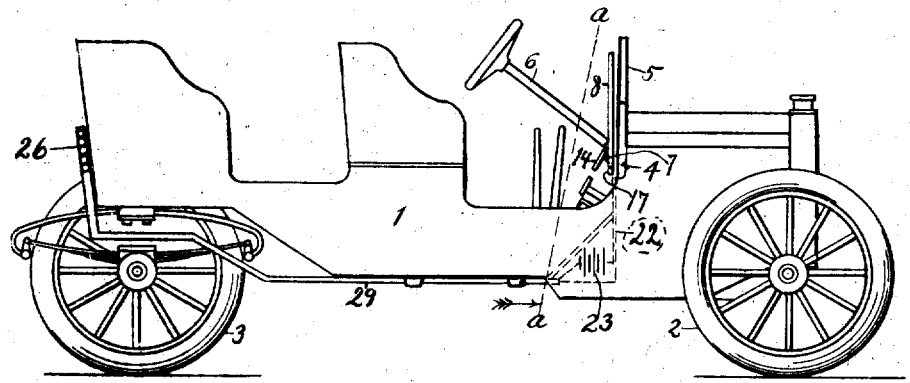
Figure 2:
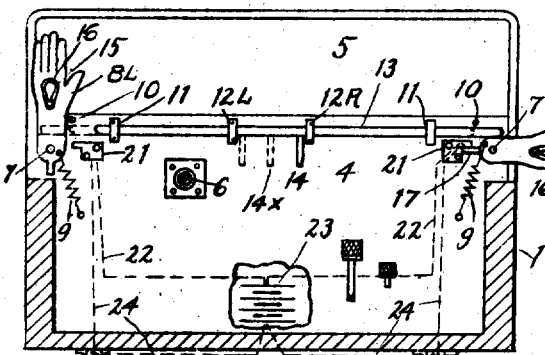
Figure 4:
Figure 5:
Figure 6:
Figure 7:
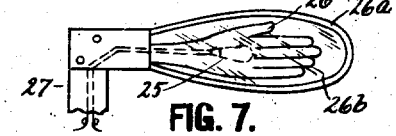
Figure 3:
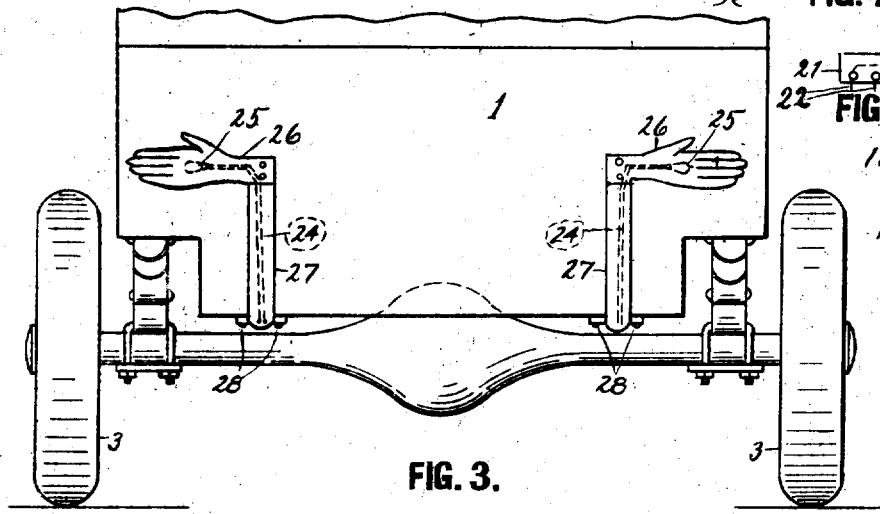

In the accompanying drawing, Figure 1 is a side elevation of an automobile equipped with my signal device and having the foot board and one of its rear wheels removed. Fig. 2 is an enlarged cross-section on the line *a—a* Fig. 1. Fig. 3 is an enlarged rear end elevation of the automobile shown in Fig. 1, with a small portion of the top added. Fig. 4 is a detail top view of the right side signal hand on the dash-board and the portion of the board on which it is mounted. Fig. 5 is a view of the signal arm showing a modified construction of the part shown in Fig. 4. Fig. 6 is detail top view of one of the rear signal hands and adjacent part of the vehicle. Fig. 7 is a rear elevation of the hand in Fig. 6. Fig. 8 is a bottom view of the electric switch member near the right hand end of the dash board. Fig. 9 is mainly an enlarged portion of the right side hand on the dash board.

Referring to the drawing by reference numerals, 1 designates the body, 2 the front wheels, 3 the rear wheels, 4 the dash board, 5 the wind shield and 6 the steering device of an automobile equipped with my signal devices.

Pivoted at 7 near each end of the dashboard is the figure of a human hand 8L or 8R which is normally held by a spring 9 against a stop 10 and thereby in vertical position, as shown to the left in Fig. 2. Slidable in bearings 11 and 12L and 12R on the dash board is an actuating rod 13 having a handle 14. When said handle is against the bearing 12R the hand 8R is held in horizontal outward position by the adjacent end of the rod 13; when the handle 14 is against the bearing 12L the hand 8L is pushed outward to horizontal position while the hand 8R is held upright by the spring 9, and if the handle 14 is moved about midway between the bearings 12L and 12R and released the springs 9 and the hands will move the rod 13 with its handle 14 just midway between the bearing, as 14X, and will hold it there against accidental displacement, because when the two hands being spring-held against the studs 10 they are one close to each end of the rod 13 in idle position.

In Figs. 2 and 4 is shown how each hand, 8R and 8L has an aperture 15 in its palm, and in said aperture is fixed an incandescent lamp 16, having a red bulb projecting beyond both sides of the hand so as to throw red light upon both sides of it; the hand being thin and normally white so as to show well up also by daylight. In Fig. 5 is shown that said hand may be a hollow transparent hand 8RX with the lamp 16 inside. In either case the hand is provided with a switch member 17 holding the ends 18 of the wires 19 from the lamp (see Figs. 5 and 9) insulated from each other and arranged to contact one with each of two contact plates 20 (see Fig. 8) of a switch member or block 21 fixed on the dash board and connected by wires 22 (see Fig. 2) with one pole of an electric battery 23, which may be located in any suitable cavity of the body 1, the other two wires 24 extend to the other pole of the battery, but on the way they pass through two more electric lamps 25 in hands 26 at the rear of the vehicle (see Fig. 3).

Each hand 26 is permanently fixed in horizontal position on a hollow post 27 which is secured at 28 to the rear end of the vehicle body. The wires 24 may pass inside each post or along a groove in it. In Fig. 2, 29 designate strips or tubes which may conceal and protect the wiring underneath the floor of the vehicle, though the wires may also be otherwise concealed in the structure itself, especially if the signal is provided for at the time the vehicle is being built. In Figs. 6 and 7 is indicated that the hand 26 may be painted on a shield 26ª and lighted up by a red bulb lamp, 25, or the hand may be painted in outlines on a glass 26ᵇ which protects the cavity in the shield from snow and hail. But in Fig. 3 each hand may also be regarded as a hollow glass hand, similar to that in Fig. 5 or it may be flat like that in Fig. 4.

In the use of the invention when, the vehicle is a large automobile, for instance, and another vehicle comes close up behind it just before the large one is to turn the one behind may not be able to see the front hands 8, but will be informed by the hands 26, while vehicles ahead of the large one are signaled by the hands 8. Hence the front and rear hands are of value for service simultaneously but it is obvious that for small or ordinary vehicles the front hands alone may answer ever purpose.

In the actual operation when the driver or operator approaches a corner where he wishes to turn to the right he simply throws the handle 14 to the right until it stops against bracket 12R and the two right hand lamps will be lighted and will illuminate the front and rear hand at the side of the vehicle and the front hand will be turned outward in a pointing position. The same will be the case with the side hands and lamps if the handle 14 be pushed to the left; and when the turning movement is completed, the handle 14 is moved near the position 14X and released, with the result already stated, that the front hands are thrown upward and all the lights in the hands are extinguished.

What I claim is:

1. The combination with a vehicle, of two mechanical hands pivotally mounted to swing in a vertical plane near the opposite sides of the vehicle, a spring holding each hand normally in upright position, a slidable actuating rod arranged to act directly against and push alternately with either one of its ends one of the hands into horizontal position out from the vehicle so as to make it serve as a signal of intended change in the course of movement of the vehicle, said rod being held in either of its outwardly pushed positions by the pressure of the signal hand and the spring acting on same.

2. The combination with a vehicle, of two mechanical hands pivotally mounted to swing in a vertical plane near the opposite sides of the vehicle, a spring holding each hand normally in upright position, a slidable actuating rod arranged to act directly against and push alternately with either one of its ends one of the hands into horizontal position out from the vehicle so as to make it serve as a signal of intended change in the course of movement of the vehicle; said acting end of the rod passing upon the hand above the pivot so as to hold the hand in horizontal position until the rod is retracted by the operator, the outward folded hands and their springs acting on the rod to hold it projected until it is partly retracted by the operator.

3. The combination with a vehicle, of two mechanical hands pivotally mounted near the opposite sides of the vehicle, a spring holding each hand normally in upright position, a slidable actuating rod arranged to act directly against and push alternately with either one of its ends one of the hands into horizontal position out from the vehicle so as to make it serve as a signal of intended change in the course of movement of the vehicle; said acting end of the rod passing upon the hand above the pivot so as to hold the hand in horizontal position and to be engaged and held against accidental movement by the hand until the rod is retracted by the operator, means for stopping the spring action on the hands when the hands reach the upright position, said hands when in upright position being held by said springs one against each end of the operating rod so as to hold the rod in normal position.

In testimony whereof I affix my signature.

WILLIAM E. ADAMS.